United States Patent Office 3,249,608
Patented May 3, 1966

3,249,608
HYDROXYPHENYL-1,3,5-TRIAZINES
Hans Rudolf Biland, Basel, Christian Luethi, Muenchenstein, and Max Duennenberger, Frenkendorf, Basel-Land, Switzerland, assignors to Ciba Limited, Basel, Switzerland, a Swiss company
No Drawing. Filed July 21, 1964, Ser. No. 384,243
Claims priority, application Switzerland, July 26, 1963, 9,330/63
15 Claims. (Cl. 260—248)

The present invention provides valuable new hydroxyphenyl-1,3,5-triazines of the general formula (1)
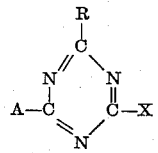

where R represents a hydroxybenzene radical which contains in ortho-position to the bond to the triazine ring a hydroxy group and in para-position to said bond a radical of the formula (2)
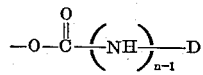

where D represents an organic radical and $n=1$ or 2, A represents a benzene radical and X a halogen atom or a benzene radical.

Particularly valuable new hydroxyphenyl-1,3,5-triazines of the general formula 1 are, for example, those of the formula (3)
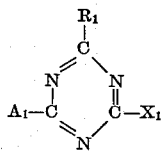

where $R_1$ represents a radical of the formula (4)
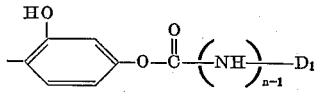

in which $n=2$ or especially 1, and $D_1$ stands for an alkyl group containing 1 to 18 carbon atoms or a benzene radical of the formula (5)
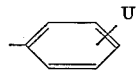

where U represents a hydrogen atom, a halogen atom such as fluorine or especially chlorine, a hydroxyl group, an alkyl group containing 1 to 4 carbon atoms or an alkoxy group with up to 8 carbon atoms; $A_1$ represents a radical $R_1$ or a radical of the formula (6)
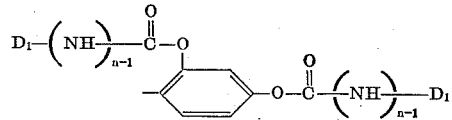

where $D_1$ and $n$ have the same meanings as in the Formula 4, or a benzene radical of the formula (7)
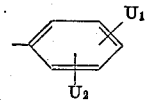

where $U_1$ represents a hydrogen atom, a halogen atom such as fluorine, bromine or especially chlorine, a hydroxyl group or a lower alkyl or alkoxy group containing 1 to 4 carbon atoms, such as methyl, ethyl, tertiary butyl, methoxy, isopropoxy or n-butoxy, and $U_2$ stands for a hydrogen atom, a hydroxyl group or a lower alkyl group containing 1 to 4 carbon atoms, and $X_1$ represents one of the radicals shown above for $A_1$. Especially valuable among these hydroxyphenyl-1,3,5-triazines of the Formula 3 are those which correspond to the formula (8)
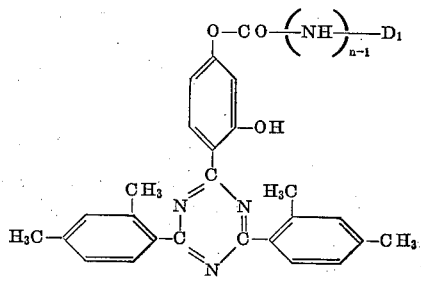

where $n$ and $D_1$ have the same meanings as in the Formulae 4 and 6; furthermore also those which correspond to the formula (9)
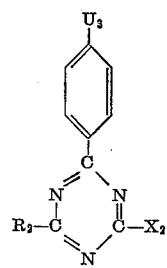

where $R_2$ represents a radical of the formula

(10)
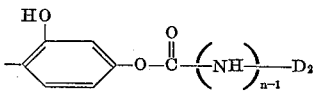

where $n=2$ or especially 1, and $D_2$ represents an alkyl group containing 1 to 18 carbon atoms or a benzene radical of the formula

(11)
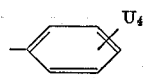

where $U_4$ represents a hydrogen or chlorine atom or a lower alkyl group containing 1 to 4 carbon atoms; $U_3$ represents a hydrogen atom a halogen atom, especially a chlorine atom, or a lower alkyl or alkoxy group containing up to 4 carbon atoms, and $X_2=R_2$ or represents a radical of the formula

(12) 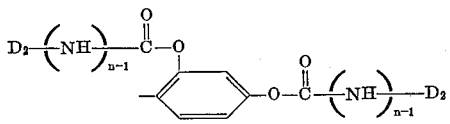

where $n$ and $D_2$ have the same meanings as in the Formula 10.

The new hydroxyphenyl-1,3,5-triazines of the general Formula 1 are obtained in the known manner, for example when a suitable hydroxyphenyl-1,3,5-triazine containing at least one hydroxybenzene radical which contains in ortho-position and in para-position to the bond to the triazine ring a hydroxyl group each is reacted, for example, by a known method, in the presence of a tertiary amine and if desired in an inert organic solvent with an isocyanate of the Formula 13 D—N=C=O or with an acid halide of the formula

(14) 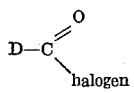

or with an acid anhydride of the formula

(15) 

where D has the same meaning as in the Formula 2, in a manner such that a hydroxyphenyl-1,3,5-triazine of the above composition (a urethane or ester) is formed.

The 2',4'-dihydroxyphenyl-triazine compounds used as starting material are either known or can be prepared by known methods, for example by a Friedel-Crafts condensation, of suitable compounds of the benzene series with suitable halogenotriazines.

As examples of isocyanates of the Formula 13 there may be mentioned the following aliphatic, cycloaliphatic and aromatic compounds:

n-butylisocyanate
dodecylisocyanate
octadecylisocyanate
cyclohexylisocyanate
phenylisocyanate
para-ethoxyphenylisocyanate
para-chlorophenylisocyanate
ortho-tolylisocyanate
meta-tolylisocyanate
para-tolylisocyanate.

Suitable acid halides of the Formula 14 and acid anhydrides of the Formula 15 are, for example, those of the following acids:

acetic acid
propionic acid
butyric acid
caproic acid
caprylic acid
capric acid
palmitic acid
stearic acid
benzoic acid
salicylic acid
para-chlorobenzoic acid
para-tertiary butylbenzoic acid
para-octylhydroxybenzoic acid.

The new hydroxyphenyl-1,3,5-triazines of the above compositions are suitable for use as stabilisers for a very wide variety of organic materials, especially as ultraviolet filters.

Accordingly, the present invention includes also a process for protecting organic materials from the harmful effects of heat, air and especially ultraviolet rays, using a new hydroxyphenyl-1,3,5-triazine of the Formula 1.

Quite generally, there are three different ways of using the new products, either separately or in combinations:

(A) The stabiliser, especially the light filter, is incorporated with a substrate to protect it from the attack by ultraviolet rays, so as to prevent a change in one or more physical properties, for example discoloration, impairment of the tear strength, embrittlement or the like and/or chemical reactions triggered off by ultraviolet rays, for example oxidation. The incorporation may take place before or during the manufacture of the substrate or subsequently by a suitable operation, for example by a fixing operation similar to a dyeing process.

(B) The light filter is incorporated with a substrate in order to protect one or more other substances contained in the substrate, for example dyestuffs, assistants or the like. The protection of the substrate described under (A) above may be achieved at the same time.

(C) The light filter is incorporated with a "filter layer" for the purpose of protecting a substrate placed directly underneath or at a distance from it (for example in a shop window) from the attack by ultraviolet rays. The filter layer may be solid (a film, foil or dressing) or semi-solid (a cream, oil or wax).

Thus, the process for protecting organic materials from the harmful effects of heat, air and especially ultraviolet rays consists in incorporating a new hydroxyphenyl-1,3,5-triazine of the Formula 1 with, or fixing on, the organic material to be protected itself or a substrate containing the said material or a filter layer placed on top of the material to be protected.

As organic materials that can be protected there may be mentioned:

(a) Textile materials quite generally, which may be in any desired form, e.g. in the form of fibers, filaments, yarns, woven or knitted fabrics or felt, and all articles manufactured therefrom; such textile materials may consist of natural materials of animal origin, such as wool or silk, or of vegetable origin such as cellulose materials from cotton, hemp, flax, linen, jute and ramie; also of semi-synthetic materials such as regenerated cellulose, for example rayon, viscoses including spun rayon, or synthetic materials available by polymerization or copolymerization, for example polyacrylonitrile, polyvinyl chloride or polyolefines such as polyethylene and polypropylene, or those which are accessible by polycondensation, such as polyesters and above all polyamides. In the case of semi-synthetic materials it is of advantage to incorporate the protective agent already with a spinning mass, for example, a viscose spinning mass, acetylcellulose spinning mass (including cellulose triacetate) and masses destined for the manufacture of fully synthetic fibers, such as polyamide melts or polyacrylonitrile spinning masses, before, during or after the polycondensation or polymerization respectively.

(b) Other fibrous materials not being textile materials; they may be of animal origin such as feathers, hairs and pelts or hides and leathers made from the latter by natural or chemical tanning, as well as manufactured goods made therefrom; also materials of vegetable origin such as straw, wood, woodpulp or fibrous materials consisting of densified fibers, more especially paper, cardboard or hardboard, as well as finished products made from the latter. Also paper pulps used in the manufacture of paper (for example hollander pulps).

(c) Coating and dressing agents for textiles and papers, for example those based on starch or casein or on synthetic resins, for example from vinylacetate or derivatives of acrylic acid.

(d) Lacquers and films of diverse composition, for example those from acetylcellulose, cellulose propionate, cellulose butyrate or cellulose mixtures, for example cellulose acetate+butyrate and cellulose acetate+propionate; also nitrocellulose, vinylacetate, polyvinyl chloride, polyvinylidene chloride, copolymers of vinyl chloride and vinylidene chloride, alkyd lacquers, polyethylene, polypropylene, polyamides, polyacrylonitrile, polyesters and the like. Another way of using the hydroxyphenyl-1,3,5-triazines is their incorporation with wrapping materials, more especially the known transparent foils of regenerated cellulose (viscose) or acetylcellulose. In this case it is as a rule advantageous to add the protective agent to the mass from which these foils are manufactured.

(e) Natural or synthetic resins, for example epoxy resins, polyester resins, vinyl resins, polystyrene resins, alkyd resins, aldehyde resins such as formaldehyde condensation products with phenol, urea or melamine, as well as emulsions of synthetic resins (for example oil-in-water or water-in-oil emulsions). In this case it is of advantage to add the protective agent before or during the polymerization or polycondensation respectively. Furthermore, there may be mentioned synthetic resins reinforced with glass fibers and laminates made therefrom.

(f) Hydrophobic substances containing oil, fat or wax, such as candles, floor polishes, floor stains or other wood stains, furniture polishes, especially those destined for the treatment of light-colored, possibly bleached, wood surfaces.

(g) Natural rubber-like materials such as rubber, balata, gutta percha or synthetic, vulcanizable materials such as polychloroprene, olefinic polysulfides, polybutadiene or copolymers of butadiene+styrene (for example Buna S) or butadiene+acrylonitrile (for example Buna N) which may also contain fillers, pigments, vulcanization accelerators and the like, and in whose case the addition of the hydroxyphenyl-1,3,5-triazines aims at delaying the ageing and thus prevent changes in the plasticity properties and embrittlement.

(h) Cosmetic preparations such as perfumes, dyed or undyed soaps and bath salts, skin and face creams, powders, repellants and especially sunburn oils and creams.

It goes without saying that the hydroxyphenyl-1,3,5-triazines are suitable as protective agents not only for undyed but also for dyed or pigmented materials; in this application the protection extends also to the dyestuffs, whereby in some cases very substantial improvements of the fastenss to light are achieved. If desired, the treatment with the protective agent and the dyeing or pigmenting process may be combined.

Depending on the kind of material to be treated, demands made on the efficiency and durability and other requirements, the amount of the stabiliser, especially light filter, to be incorporated with the material to be treated may be varied within rather wide limits, for example from about 0.01 to 10%, preferably from 0.1 to 2%, of the weight of the material which is to be directly protected from the harmful effects of heat, air and especially ultraviolet rays.

Unless otherwise indicated, parts and percentages in the following examples are by weight.

Example 1

12 parts of 2,4-di-(2′,4′-dimethylphenyl)-6-(2′,4′-dihydroxyphenyl)-1,3,5-triazine (prepared by double Friedel-Crafts reaction of 1 mol of cyanuric chloride with (a) 2 mols of 1,3-dimethylbenzene in meta-xylene and (b) 1 mol of resorcinol in nitrobenzene, in both cases in the presence of aluminum chloride) are dissolved in 100 parts of acetone and 10 parts of pyridine, and 4 parts of acetic anhydride in 50 parts of acetone are then dropped in at 20 to 25° C. After 6 hours the batch is heated to refluxing and refluxed for another 5 hours. The reaction mixture is allowed to cool, poured into 500 parts of water, and the precipitated product is suctioned off, rinsed with water and dried, to yield 10 parts of an almost colorless powder which, after two recrystallizations from aqueous acetone, melts at 141° to 143° C. and reveals the following analytical data:

$C_{27}H_{25}O_3N_3$—Calculated: C, 73.78%; H, 5.73%, N, 9.56%. Found: C, 73.81%; H, 5.81%; N, 9.44%.

(16)
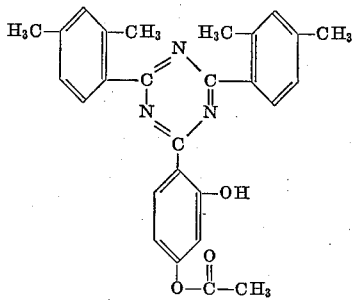

Example 2

18.7 parts of 2-phenyl-4,6-di-(2′,4′-dihydroxyphenyl)-1,3,5-triazine (prepared from 1-phenyl-3,5-dichlorotriazine and resorcinol by Friedel-Crafts reaction in nitrobenzene in the presence of aluminum chloride) are dissolved in 300 parts of dimethyl formamide, and 10.2 parts of acetic anhydride are added to the solution. The batch is left to itself for 16 hours, heated to 35° C. and 10 parts of pyridine in 100 parts of dimethyl formamide are vigorously stirred in within 2 hours. After another 12 hours at 35° C. the temperature is maintained for 8 hours at 60° C. The reaction mixture is then poured into 700 parts of water, and the precipitated product is suctioned off, washed with water and dried, to yield 19.8 parts of a faintly yellowish product.

After three recrystallizations from aqueous acetone the product reveals the following values:

$C_{25}H_{19}O_6N_3$—Calculated: C, 65.64%; H, 4.19%; N, 9.20%. Found: C, 65.67%; H, 4.22%; N, 9.40%.

Melting point: 203° to 205° C.

(17)
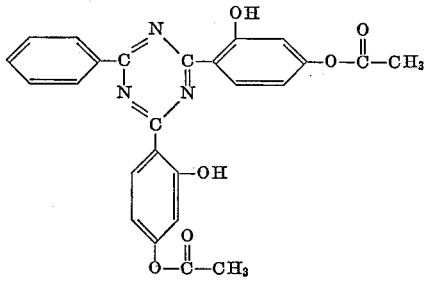

Example 3

8.1 parts of 2,4,6-tris-(2′,4′-dihydroxyphenyl)-1,3,5-triazine are dissolved in 175 parts of dimethyl formamide and 25 parts of pyridine, and 8.1 parts of acetic anhydride are dropped in within 30 minutes at 20° C. The reaction mixture is stirred for 20 hours at 20° C., then for 6 hours at 40° C. and for 6 hours at 60° C. and then poured into 1000 parts of water. The crude product (10 parts) is isolated and dried and extracted in a Soxhlet apparatus for 6 hours with ethanol. The residue (5 parts) consists of the product of the formula

(18)
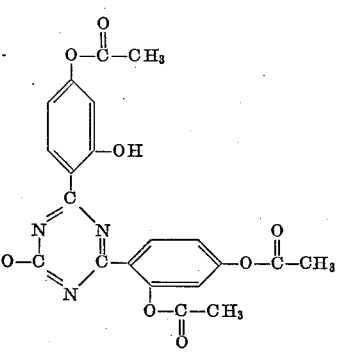

which, after recrystallization from benzene+alcohol, melts at 201° to 203° C. and reveals the following analytical data:

$C_{29}H_{23}O_{10}N_3$—Calculated: C, 60.73%; H, 4.04%; N, 7.33%. Found: C, 60.65%; H, 3.97%; N, 7.58%.

Example 4

16 parts of 2,4-di-(2',4'-dimethylphenyl)-6-(2',4'-dihydroxyphenyl)-1,3,5-triazine are dissolved in 100 parts of pyridine and within one hour 7.8 parts of propionic anhydride are dropped in. The reaction mixture is stirred for 6 hours at 20°C. and then for 6 hours at 80° C., poured into 500 parts of water and the product is suctioned off and dried, to yield 17.4 parts of the product of the formula (19)

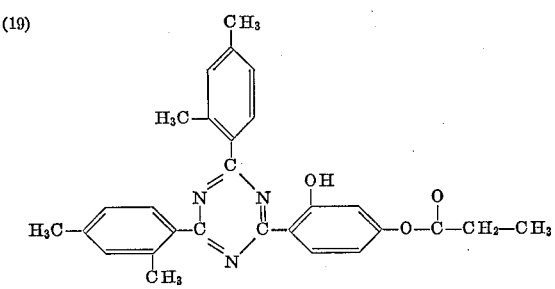

which, after one recrystallization from toluene+alcohol, melts at 127° to 129° C. and reveals the following analytical data:

$C_{28}H_{27}O_3N_3$—Calculated: C, 74.16%; H, 6.00%; N, 9.27%. Found: C, 74.40%; H, 5.98%; N, 9.28%.

Example 5

14.9 parts of 2-phenyl-4,6-di-(2',4'-dihydroxyphenyl) 1,3,5-triazine are dissolved in 700 parts of ethyleneglycol monomethyl ether and 100 parts of pyridine, and 12 parts of benzoyl chloride are dropped in within 1 hour at 60° C. After another 3 hours at 60° C. and 3 hours at 80° C. water is added at 80° C. until a slight turbidity appears, whereupon the whole is cooled and suctioned, to yield 10 parts of the product of the formula (21)

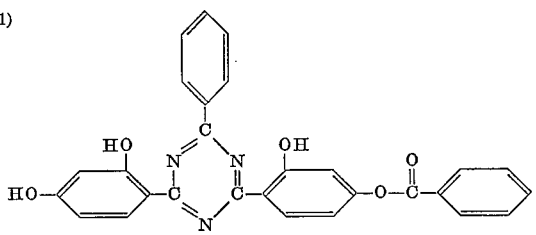

which, after one recrystallization from aqueous ethyleneglycol monomethyl ether, melts at 243° to 245° C. and reveals the following analytical data:

$C_{28}H_{19}O_5N_3$—Calculated: C, 70.43%; H, 4.01%; N, 8.80%. Found: C, 70.40%; H, 4.13%; N, 8.40%.

On addition of water to the mother liquor of the reaction mixture 6 parts of starting material are precipitated.

Example 6

11.1 parts of 2-phenyl-4,6-di-(2',4'-dihydroxyphenyl)-1,3,5-triazine and 3.3 parts of potassium hydroxide are dissolved in 200 parts of ethyleneglycol monomethyl ether and 10 parts of pyridine, whereupon within one hour 9.3 parts of benzoyl chloride are dropped in between 5° and 10° C. The batch is then stirred for 5 hours at room temperature (approximately 18° C.) and then for 8 hours at 80° C. and the product of the formula (22)

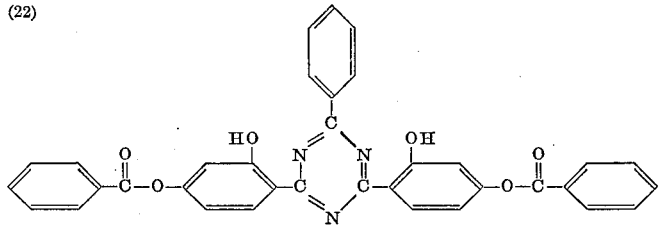

When in the above example propionic anhydride is replaced by 8 parts of salicylic acid chloride, the product of the formula (20)

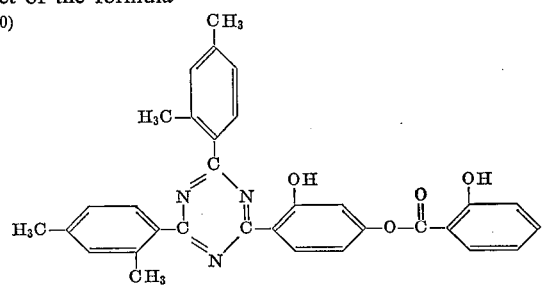

is obtained which, after recrystallization from benzene+alcohol and benzine, melt at 184° to 185° C. and reveals the following analytical data:

$C_{32}H_{27}O_4N_3$—Calculated: C, 74.26%; H, 5.26%; N, 8.12%. Found: C, 73.96%; H, 5.35%; N, 7.88%.

is precipitated by pouring the whole into water. After two recrystallizations each from ethyleneglycol monomethyl ether and aqueous acetone the compound melts at 150° to 153° C. and, after solidification, once more at 196° to 197° C., and it reveals the following analytical data:

$C_{35}H_{23}O_6N_3$—Calculated: C, 72.28%; H, 3.99%; N, 7.23%. Found: C, 71.51%; H, 4.08%; N, 7.13%.

Example 7

18.7 parts of 2-phenyl-4,6-di-(2',4'-dihydroxyphenyl)-1,3,5-triazine are suspended at 20° C. in 200 parts of pyridine. At 20° C. 25.4 parts of benzoyl chloride are dropped in within one hour and the mixture is stirred for 3 days at 20° to 25° C. After much of the suspension has dissolved, a thick crystalline magma forms gradually, which is suctioned and dried, to yield 18.7 parts of the compound of the formula (23)

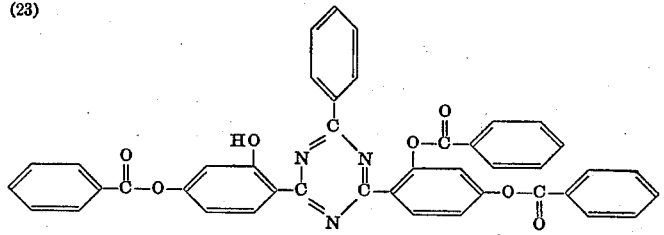

On addition of 400 parts of ethanol to the mother liquor another 11.4 parts of the product precipitate. After recrystallization from toluene+alcohol the compound of the Formula 23 melts at 170° to 172° C. and reveals the following analytical data:

$C_{42}H_{27}O_7N_3$—Calculated: C, 73.50%; H, 4.00%; N, 6.10%. Found: C, 73.30%; H, 4.40%; N, 6.10%.

*Example 8*

20 parts of 2,4-di-(2',4'-dimethylphenyl)-6-(2',4'-dihydroxyphenyl)-1,3,5-triazine together with caprylic acid chloride (10% over the stoichiometric amount) are suspended in 70 parts of dichlorobenzene. The temperature is then raised to 150° to 170° C. at which temperature the batch is stirred until all has dissolved and then cooled to 100° C., whereupon 200 parts of ethanol are added. After cooling, suctioning and rinsing with ethanol, there are obtained 23 parts of the product of the formula (24)

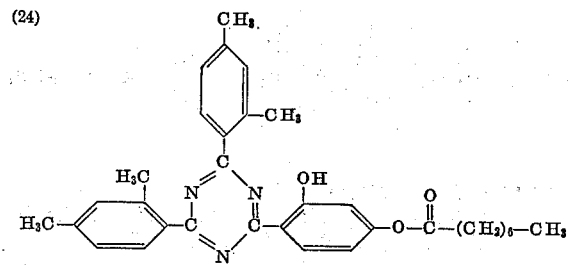

which melts very little below the analytically pure product (which melts at 95° to 96° C.) obtained by recrystallization from toluene+alcohol.

(27)

$C_{33}H_{37}O_3N_3$—Calculated: C, 75.69%; H, 7.12%; N, 8.03%. Found: C, 75.60%; H, 7.13%; N, 7.81%.

(28)

When caprylic acid chloride is replaced by benzoyl chloride, a similar reaction yields the product of the formula (25)

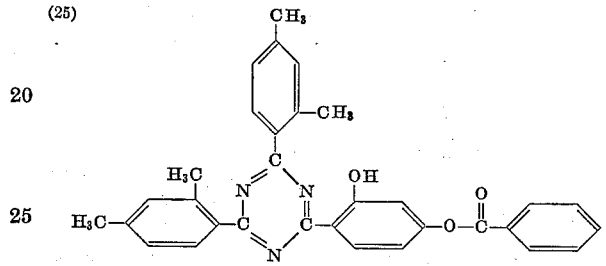

in a similar purity and yield. It melts at 169° to 170° C.

$C_{32}H_{27}O_3N_3$—Calculated: C, 76.62%; H, 5.43%; N, 8.38%. Found: C, 76.26%; H, 5.41%; N, 8.44%.

In an analogous manner, using the appropriate acid chlorides, the following compounds are obtained:

(26)

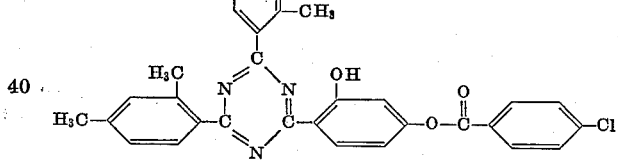

Melting point: 199° to 200° C.

$C_{32}H_{26}O_3N_3Cl$—Calculated: C, 71.70%; H, 4.89%; N, 7.84%. Found: C, 71.60%; H, 5.09%; N, 7.90%.

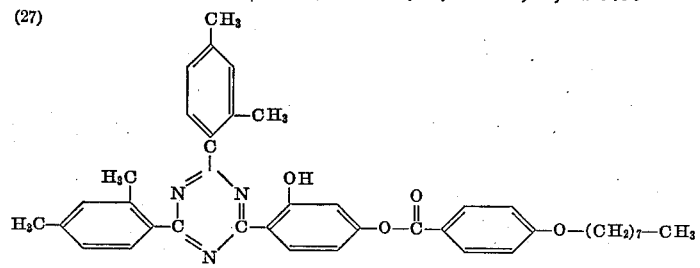

Melting point: 112° to 114° C.

$C_{40}H_{43}O_4N_3$—Calculated: C, 76.28%; H, 6.88%; N, 6.67%. Found: C, 76.35%; H, 6.92%; N, 6.64%.

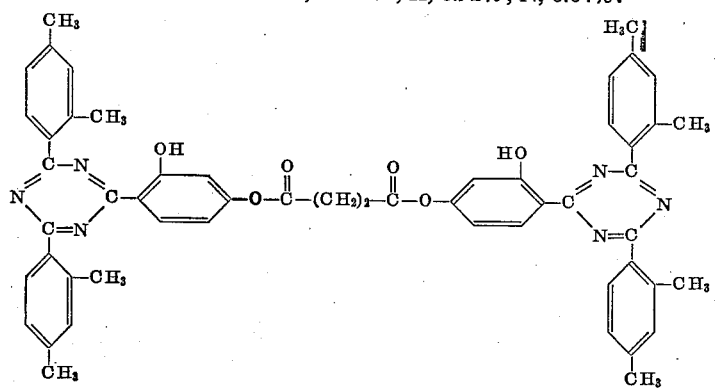

Melting point: 246° to 248° C.
$C_{54}H_{48}O_6N_6$—Calculated: C, 73.95%; H, 5.52%; N, 9.58%. Found: C, 74.10%; H, 5.40%; N, 9.70%.

(29)

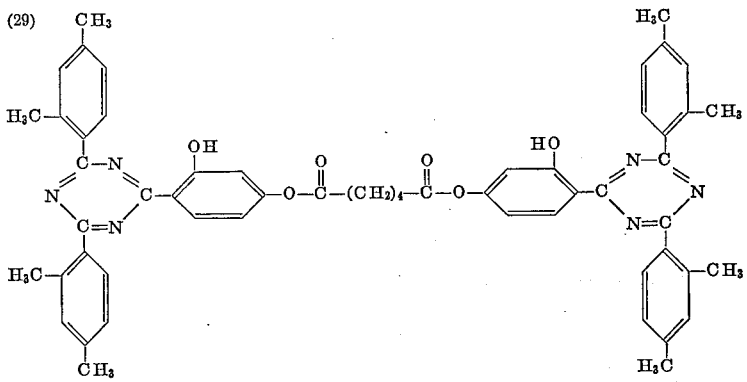

Melting point: 204° to 205° C.
$C_{54}H_{50}O_6N_6$—Calculated: C, 74.48%; H, 5.58%; N, 9.31%. Found: C, 74.38%; H, 5.83%; N, 9.06.

*Example 9*

When in Example 8, 2,4-di-(2',4'-dimethylphenyl)-6-(2',4'-dihydroxyphenyl)-1,3,5-triazine is replaced by 2-phenyl-4,6-di-(2',4'-dihydroxyphenyl)-1,3,5-triazine, using the relevant acid chlorides, an analogous reaction furnishes the following compounds in similar purity and yield:

(30)

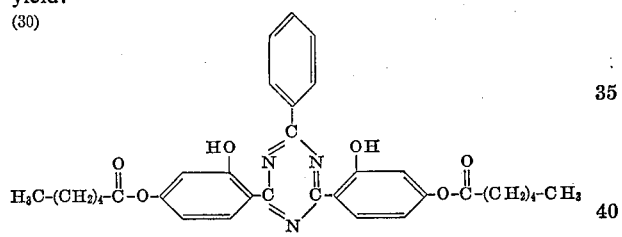

Melting point: 127° to 128° C.
$C_{33}H_{35}O_6N_3$—Calculated: C, 69.58%; H, 6.19%; N, 7.38%. Found: C, 69.35%; H, 6.07%; N, 7.30%.

(31)

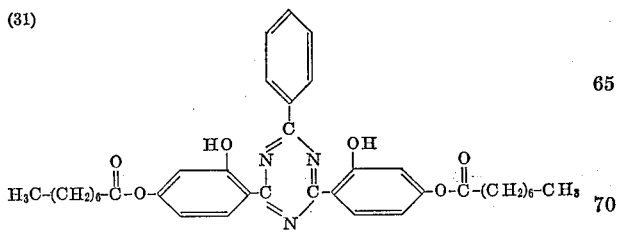

Melting point: 116° to 117° C.

$C_{37}H_{43}O_6N_3$—Calculated: C, 71.02%; H, 6.93%; N, 6.72%. Found: C, 71.07%; H, 6.93%; N, 6.79%.

(32)

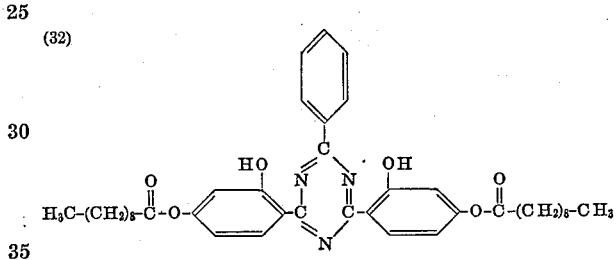

Melting point: 120° to 121° C.
$C_{41}H_{51}O_6N_3$—Calculated: C, 72.22%; H, 7.54%; N, 6.16%. Found: C, 72.20; H, 7.66; N, 6.05%.

(33)

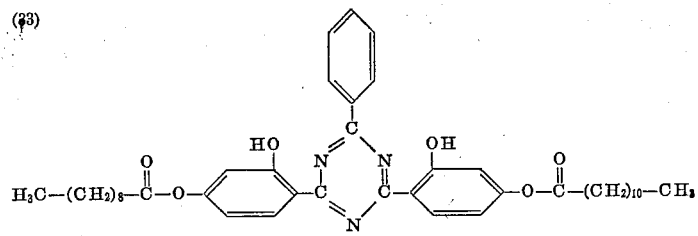

Melting point: 114° to 115° C.
$C_{45}H_{59}O_6N_3$—Calculated: C, 73.24%; H, 8.06%; N, 5.69%. Found: C, 73.32%; H, 7.97%; N, 5.78%.

From the dichlorobenzene-alcohol mother liquor of this experiment there can be additionally obtained by evaporation and recrystallization of the residue from benzene+cyclohexane the compound of the formula (34)

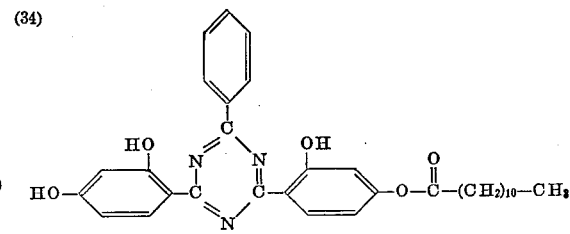

Melting point: 168° to 169° C.
$C_{33}H_{37}O_5N_3$—Calculated: C, 71.33%; H, 6.71%; N, 7.56%. Found: C, 71.09%; H, 6.99%; N, 7.54%.

(35)

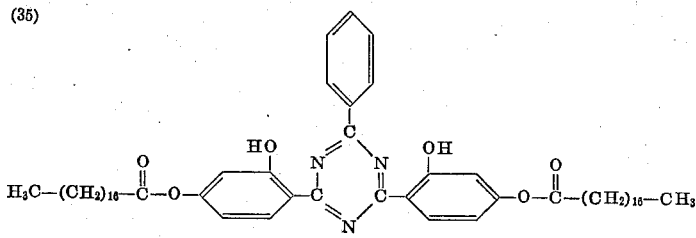

Melting point: 105° to 107° C.
$C_{57}H_{83}O_6N_3$—Calculated: C, 75.54%; H, 9.23%; N, 4.64%. Found: C, 75.71%; H, 9.21%; N, 4.64%.

(36)

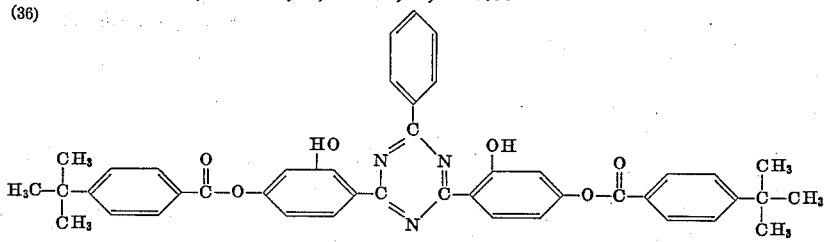

Melting point: 255° to 258° C.
$C_{43}H_{39}O_6N_3$—Calculated: C, 74.44%; H, 5.67%; N, 6.06%. Found: C, 74.26%; H, 5.78%; N, 6.04%.

When an analogous reaction is performed with butyrylchloride, the batch is stirred for 2 days at 100° to 105° C. and the undissolved starting material is filtered off, the compound of the formula (37)

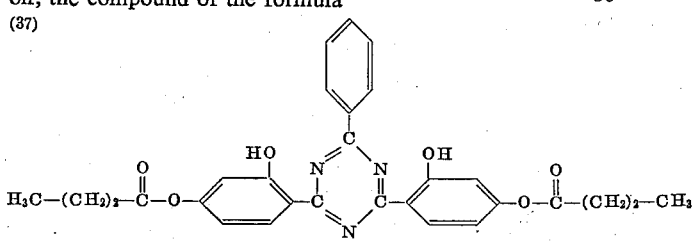

is obtained in a yield of 30%.
Melting point: 149 to 150° C.
$C_{29}H_{27}O_6N_3$—Calculated: C, 67.82%; H, 5.30%; N, 8.18%. Found: C, 68.08%; H, 5.24%; N, 8.19%.

*Example 10*

The reaction described in Example 9, performed with 2 - (parabutylphenyl) - 4,6 - di - (2',4' - dihydroxyphenyl)-1,3,5-triazine and capryl chloride, yields the compound of the formula (38)

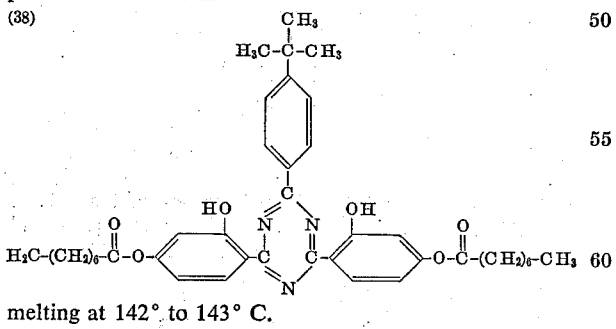

melting at 142° to 143° C.

$C_{41}H_{51}O_6N_3$—Calculated: C, 72.22%; H, 7.54%; N, 6.16%. Found: C, 71.99%; H, 7.53%; N, 6.24%.

A similar reaction of 2 - (para - methoxyphenyl)- 4,6 - di - (2',4' - dihydroxyphenyl) - 1,3,5 - triazine yields the compound of the formula (39)

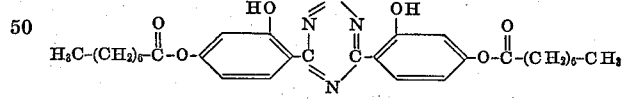

melting at 123° to 125° C.
$C_{38}H_{45}O_7N_3$—Calculated: C, 69.60%; H, 6.92%; N, 6.41%. Found: C, 69.72%; H, 6.81%; N, 6.22%.

*Example 11*

When in Example 9, 2,4,6-tris-(2',4'-dihydroxyphenyl) 1,3,5-triazine is reacted with stearyl chloride for 24 hours at 160° C. and the undissolved starting material is filtered off before adding ethanol, there is obtained the compound of the formula (40)

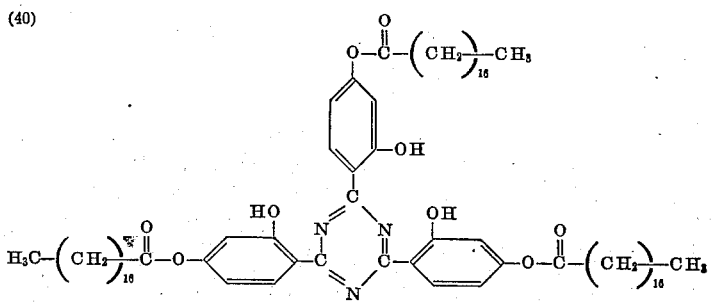

melting at 95° to 96° C. in a yield of about 30%.

$C_{75}H_{117}O_9N_3$—Calculated: C, 74.77%; H. 9.79%; N, 3.49%. Found: C, 74.97%; H, 9.67%; N, 3.50%.

*Example 12*

When, as described in Example 9, 2-phenyl-4,6-di-(2',4'-dihydroxyphenyl)-1,3,5-triazine is reacted with four times the molecular proportion of para-chlorobenzoyl chloride for 16 hours at 160° C., the crude product must first be freed from the tetra-esterified material by extraction with acetone. The extraction residue is then once more extracted with ethyl acetate. When the ethyl acetate extract is evaporated to dryness, it yields directly the product of the formula (41)

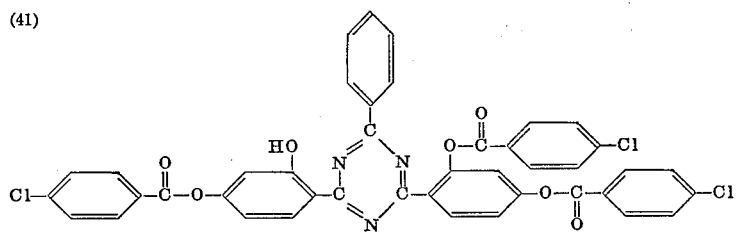

melting at 203° to 205° C.

$C_{42}H_{24}O_7N_3Cl_3$—Calculated: C, 63.93%; H, 3.07%; N, 5.33%. Found: C, 64.23%; H, 3.27%; N, 5.08%.

When the crude product extracted with acetone and ethyl acetate is recrystallized from dimethyl formamide+acetone, it yields the product of the formula (42)

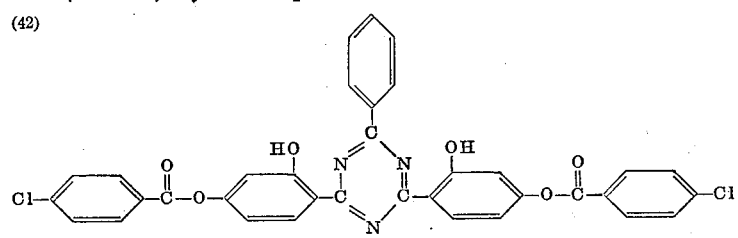

melting at 287° to 281° C.

$C_{35}H_{21}O_6N_3Cl_2$—Calculated: C, 64.63%; H, 3.25%; N, 6.46%. Found: C. 64.63%; H, 3.42%; N, 6.45%.

*Example 13*

20 parts of 2,4-di-(2',4'-dimethylphenyl)-6-(2',4'-dihydroxyphenyl)-1,3,5-triazine [prepared by double Friedel-Crafts reaction of 1 mol of cyanuric chloride with (a) 2 mols of 1,3-dimethylbenzene in meta-xylene and (b) 1 mol of resorcinol in nitrobenzene, both cases in the presence of aluminum chloride] are dissolved in 100 parts of triethylamine and mixed with 4.1 parts of ethyl-isocyanate. The reaction mixture is heated to refluxing, then allowed to cool and poured into 100 parts of petroleum ether. The precipitated produce of the formula (43)

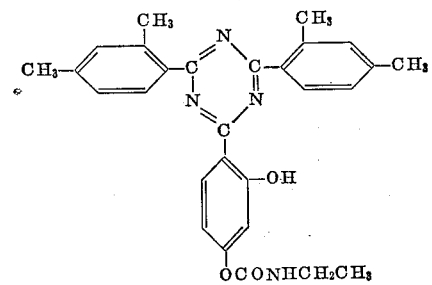

is suctioned off and washed with petroleum ether. Yield: 19.2 parts. The analytically pure product obtained by two recrystallizations from benzene+methanol melts at 175° C. and reveals the following analytical data:

$C_{28}H_{28}N_4O_3$—Calculated: C, 71.77%; H, 6.02%; N, 11.96%. Found: C, 72.03%; 6.22%; N, 11.92%.

The following compounds are manufactured in a similar manner:

(44)

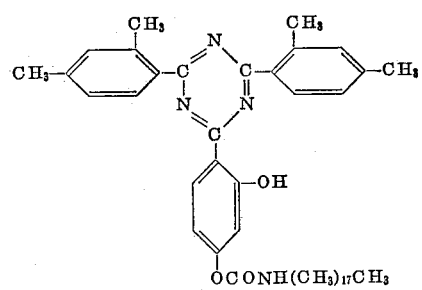

melting at 172° to 173° S. (from benzene+methanol).

$C_{30}H_{32}N_4O_3$—Calculated: C, 7.55%; H, 6.50%, N, 11.28%. Found: C, 72.21%; H, 6.63%; N, 11.32%.

(45)

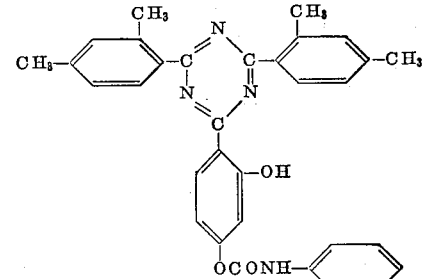

melting at 116° to 119° (from benzene+methanol).

$C_{44}H_{60}N_4O_3$—Calculated: C, 76.26%; H, 8.73%; N, 8.09%. Found: C, 76.38/; H, 9.65%; N, 7.74%.

(46)

Melting at 177 to 178° C. (fom benzene).

$C_{32}H_{28}N_4O_3$—Calculated: C, 74.40%; H, 5.46%; N, 10.85%. Found: C, 74.32%; H, 5.46%; N, 11.00%.

(47)

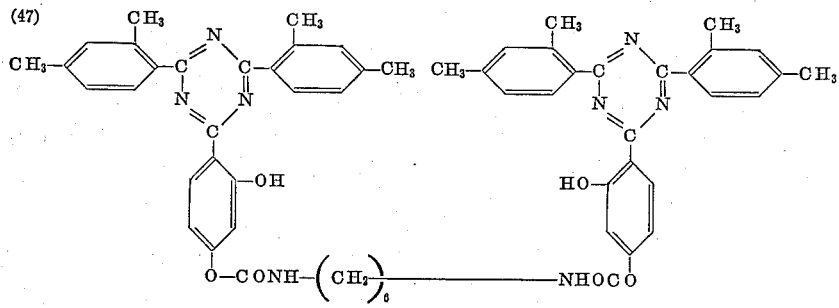

melting at 205° to 209° C.

$C_{58}H_{58}O_6N_8$—Calculated: C, 72.33%; H, 6.07%; N, 11.63%. Found: C, 72.32%; H, 6.53%; N, 11.92%.

*Example 14*

18.7 parts of 2-phenyl-4,6-di-(2',4'-dihydroxyphenyl)-1,3,5-triazine (prepared from 2-phenyl-4,6-dichloro-1,3,5-triazine and resorcinol by Friedel-Crafts reaction in nitrobenzene in the presence of aluminum chloride) are suspended in 500 parts of dichlorobenzene and mixed with 3 parts of triethylamine. 54 parts of octadecylisocyanate are then added and the reaction mixture is heated to refluxing. When a clear solution has formed, the reaction is discontinued, the batch is cooled to 80° C. and mixed with 1000 parts of methanol. The precipitated product of the formula (48)

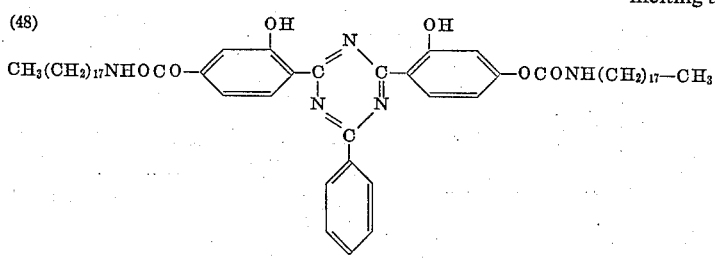

is suctioned off and dried under vacuum.

Yield: 45.5 parts. An analytically pure product obtained by three recrystallizations from dioxane+methanol melts at 187° to 189° C. and reveals the following values:

$C_{59}H_{89}N_5O_6$—Calculated: C, 73.48%; H, 9.30%; N, 7.26%. Found: C, 73.34%; H, 9.22%; N, 7.40%.

The following compounds are manufactured in a similar manner:

(49)

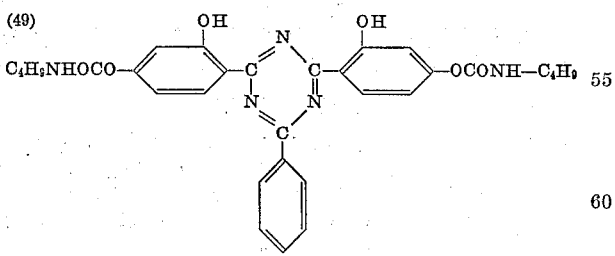

melting at 224° to 226° C. with decomposition.

$C_{31}H_{33}N_5O_6$—Calculated: C, 65.13%; H, 5.82%; N, 12.25%. Found: C, 64.87%; H, 6.08%; N, 12.33%.

(50)

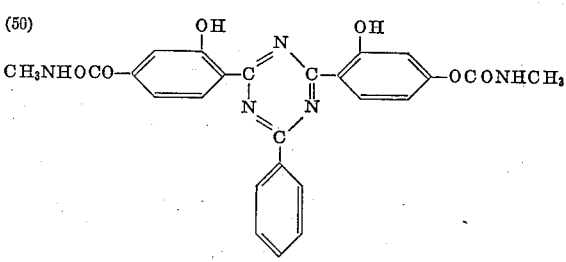

melting at 280° C. with decomposition.

$C_{25}H_{21}O_6N_5$—Calculated: C, 61.60%; H, 4.34%; N, 14.37%. Found: C, 61.40%; H, 4.31%; N, 14.45%.

(51)

CH$_3$CH$_2$NHOCO— [structure] —OCONHCH$_3$ melting at about 250° C. with decomposition.

$C_{27}H_{25}O_6N_5$—Calculated: C, 62.90%; H, 4.89%; N, 13.59%. Found: C, 62.99%; H, 4.76%; N, 13.51%.

(52)

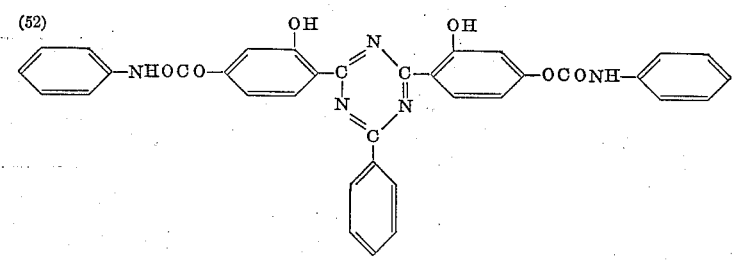

melting at about 210° C. with decomposition.

$C_{35}H_{25}O_6N_5$—Calculated: C, 68.73%; H, 4.12%; N, 11.45%. Found: C, 68.35%; H, 4.43%; N, 11.43%.

Example 15

10.75 parts of the compound of the formula

(53)
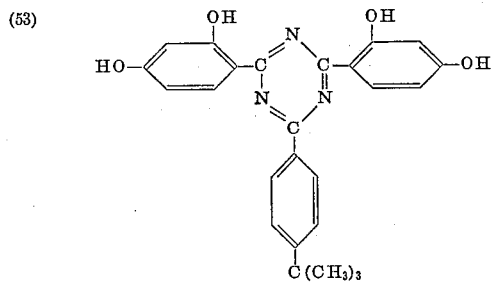

[prepared from 2-(para-tertiary butylphenyl)-4,6-dichloro-1,3,5-triazine and resorcinol by Friedel-Crafts reaction in nitrobenzene in the presence of aluminum chloride] are dissolved in 200 parts of benzene and 10 parts of triethylamine. 15 parts of n-butylisocyanate are added, the temperature is raised to refluxing for 15 minutes; the batch is cooled, mixed with 500 parts of petroleum ether, and the precipitated product of the formula

(54)
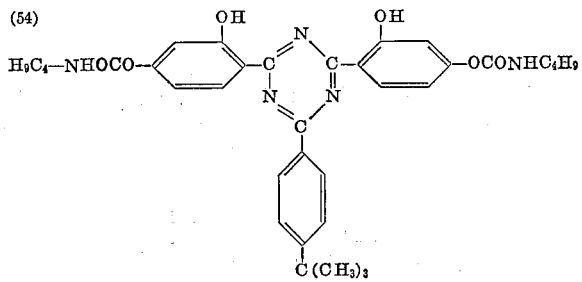

is suctioned off.

The analytically pure product obtained by recrystallization from dioxane+methanol melts at 182° to 185° C.

$C_{35}H_{41}O_6N_5$—Calculated: C, 66.96%; H, 6.58%; N, 11.56%. Found: C, 66.95%; H, 6.57%; N, 11.59%.

8.15 parts of the compound of the formula

(55)
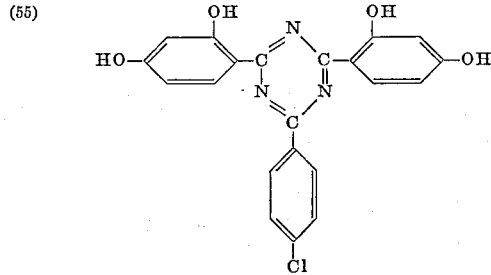

[prepared from 2-(para-chlorophenyl)-4,6-dichloro-1,3,5-triazine and resorcinol by Friedel-Crafts reaction in nitrobenzene in the presence of aluminum chloride] are dissolved in 55 parts of pyridine. At room temperature (about 18° C.) 5.8 parts of meta-tolylisocyanate are added and the temperature is then raised to 80° C. After 5 hours the batch is cooled to room temperature, whereupon the reaction product begins to crystallize out. 100 parts of petroleum ether are added and the product of the formula

(56)
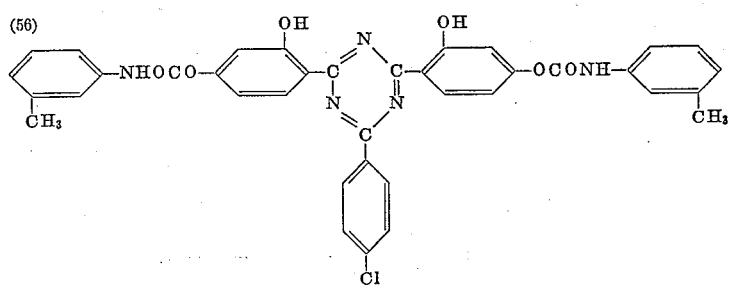

is suctioned off and dried under vacuum.

The analytically pure product obtained by recrystallization from dimethyl formamide+methanol melts above 350° C.

$C_{37}H_{28}O_6N_5Cl.1(CH_3)_2=N—CHO$—Calculated: C, 64.30%; H, 4.72%; N, 11.25%. Found: C, 64.11%; H, 4.61%; N, 11.00%.

Example 16

8.1 parts of 2,4,6-tri-(2',4'-dihydroxyphenyl)-1,3,5-triazine (prepared from 1 mol of cyanuric chloride and 3 mols of resorcinol in nitrobenzene in the presence of 3 mols of aluminum chloride) are dissolved in dimethyl formamide. 4 parts of methylisocyanate are added and the reaction solution is stirred for 2 hours at 80° C. On addition of methanol the precipitate formed becomes denser; it is suctioned off and boiled in methanol to give a yield of 5.6 parts of the analytically pure product of the formula

(57)
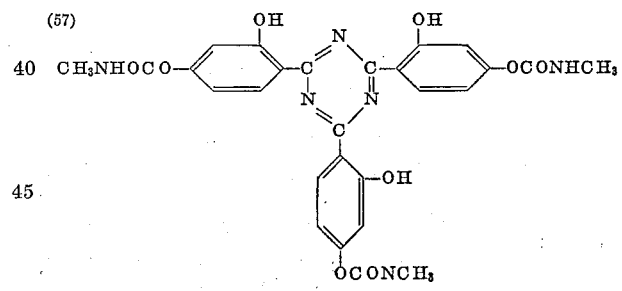

melting above 360° C.

$C_{27}H_{24}O_9N_6$—Calculated: C, 56.25%; N, 4.20%; H, 14.58%. Found: C, 55.80%; N, 4.30%; H, 14.70%.

Example 17

A film about 60μ thick is prepared from a 10% acetonic solution of acetylcellulose containing 0.5% of the compound of the Formula 16 referred to acetylcellulose. After drying, the following values of light transmission in percent are obtained.

| Wave length in mμ | Light transmission in percent | |
|---|---|---|
| | Film, unexposed | Film exposed for 100 hours in a fadeometer |
| 280 to 320 | 0 | 0 |
| 340 | 9 | 9 |
| 360 | 40 | 40 |
| 370 | 60 | 62 |
| 380 | 72 | 74 |

When in the above experiment 1% of the compound of the Formula 17 is used, the following values are obtained:

| Wave length in mμ | Light transmission in percent | |
| --- | --- | --- |
| | Film, unexposed | Film exposed for 100 hours in a fadeometer |
| 280 to 360 | 0 | 0 |
| 370 | 10 | 9 |
| 380 | 28 | 26 |
| 390 | 61 | 60 |
| 400 | 79 | 79 |

In a similar manner the stability to light of the compounds 18, 19, 25, 30 and 37 can be demonstrated.

*Example 18*

A paste from 100 parts of polyvinyl chloride, 59 parts by volume of dioctylphthalate and 0.2 part of the compound of the Formula 44 is rolled to and fro on a calender at 150° to 155° C. to form a foil. The polyvinyl chloride foil obtained in this manner absorbs completely within the ultraviolet region from 280 to 360 mμ.

Instead of the compound of the Formula 44 there may be used any one of the compounds of the Formulae 16, 17, 18, 22, 23 to 25, 31 to 33, 35, 36, 41 or 49.

*Example 19*

A mixture of 100 parts of polyethylene ("Alkathene WNG 14") and 0.2 of the compound of the Formula 17, 19, 20, 22, 24, 25, 30 to 33, 36, 40, 42 or 28 is rolled to and fro on a calender at 130° to 140° C. to form a foil which is then pressed at 130° C.

The resulting polyethylene foil is substantially impermeable to ultraviolet light within the region from 280 to 370 mμ.

*Example 20*

A mixture of 100 parts of polypropylene and 0.2 part of the compound of the Formula 19, 20, 22 to 26, 30 to 33, 35, 37, 41 or 42 is rolled to and fro on a calender at 170° C. to form a sheet which is then pressed at 230° to 240° C. under a maximum pressure of 40 kg./cm.² to form a sheet 1 mm. thick. The resulting sheets are impermeable to ultraviolet light within the region from 280 to 370 mμ. After having been exposed for 500 hours to the light of a xenone lamp the sheets have retained their full absorptivity and are much less embrittled than sheets that do not contain the compounds mentioned above.

*Example 21*

0.2 part of the compound of the Formula 43 is dissolved in 1.8 parts of monostyrene and 0.5 part of a solution of cobalt naphthenate-monostyrene (containing 1% of cobalt) is added. 40 parts of an unsaturated polyester resin based on phthalic acid-maleic acid-ethyleneglycol in monostyrene are then added and the whole is stirred for 10 minutes. 1.7 parts of a catalyst solution (methylethyl ketone peroxide in dimethyl phthalate) are dropped in and the well stirred, air-free mass is poured in between two sheets of glass. After about 20 minutes the polyester sheet (1 mm. thick) has solidified sufficiently to enable it to be taken out of the mould; it is impermeable to ultraviolet light within the region from 280 to 380 mμ and shows no signs of yellowing after 1000 hours' exposure to xenone light. When the compound of the Formula 43 is omitted, yellowing appears already after 500 hours' exposure to the xenone lamp.

The compound of the Formula 43 may be replaced by the compound of the Formula 16 to 20, 22 to 26, 28, 30 to 33, 35 to 39, 41, 44 or 54.

*Example 22*

10,000 parts of a polyamide in chip form, prepared in the known manner from caprolactam and pigmented with 0.3% of titanium dioxide, are mixed with 50 parts of the compound of the Formula 19 or 37 in a tumbler for 12 hours and then melted in an oil-fired boiler at 300° to 310° C. from which the atmospheric oxygen has been displaced by superheated steam. After stirring for half an hour the melt is expressed with nitrogen under a pressure of 5 atmospheres (gauge) through a spinneret. The resulting filaments are exposed for 120 hours to the xenone test. The degree of degradation of the macromolecules due to light is measured by the relative viscosity of the polyamide fibers dissolved in concentrated sulfuric acid. This evaluation reveals that the filaments not containing the compound of the Formula 19 or 37 are more extensively attacked by light than those which contain one of these compounds.

What is claimed is:

1. A hydroxyphenyl-1,3,5-triazine of the formula

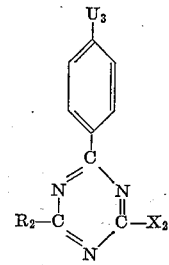

wherein $R_2$ is a radical of the formula

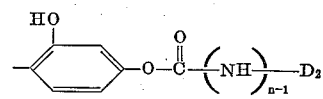

wherein $n$ is a whole positive number of at most 2 and $D_2$ is a member selected from the group consisting of alkyl having from 1 to 18 carbon atoms and a benzene radical of the formula

where $U_4$ is selected from hydrogen, chlorine and lower alkyl, $U_3$ is a member selected from the group consisting of hydrogen, halogen, lower alkyl and lower alkoxy, and $X_2$ is a member selected from the group consisting of a radical $R_2$ and a benzene radical of the formula

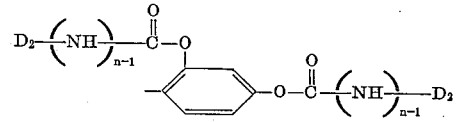

wherein $D_2$ and $n$ have the above meanings.

2. A hydroxyphenyl-1,3,5-triazine of the formula

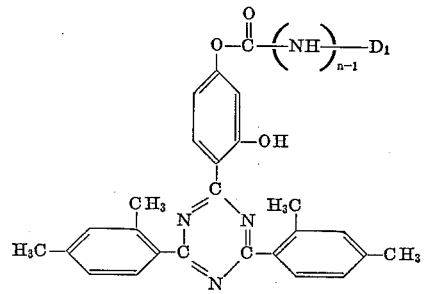

wherein $n$ is a whole positive number of at most 2, $D_1$ is selected from alkyl having from 1 to 18 carbon atoms and a benzene radical of the formula

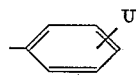

wherein U is a member selected from the group consisting of hydrogen, halogen, hydroxy, lower alkyl and alkoxy with up to 8 carbon atoms.

3. The compound of the formula
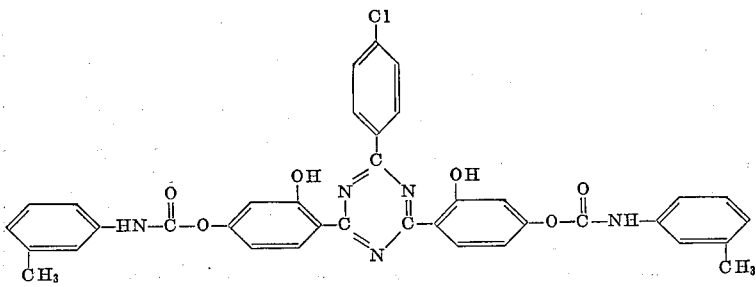
4. The compound of the formula
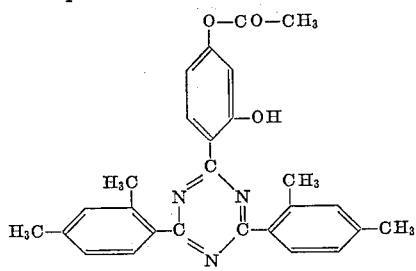
5. The compound of the formula
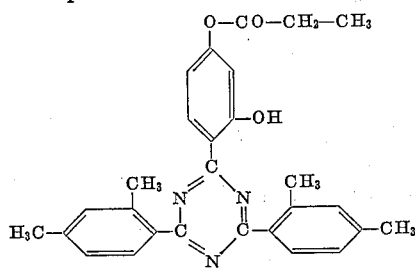
6. The compound of the formula
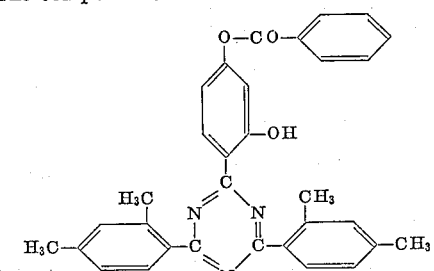
7. The compound of the formula
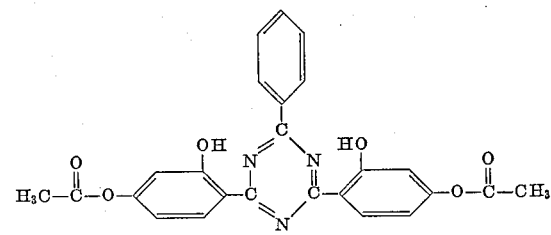
8. The compound of the formula
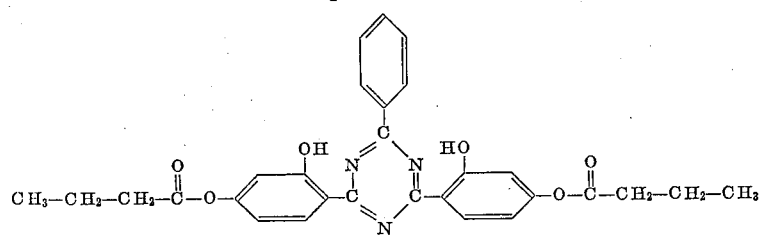
9. The compound of the formula
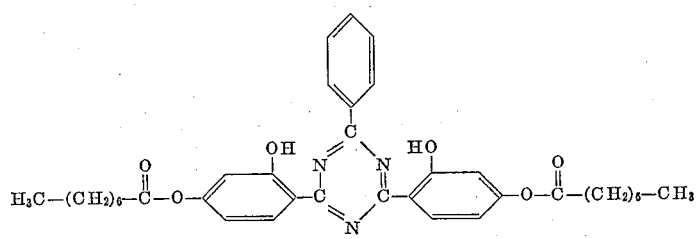
10. The compound of the formula
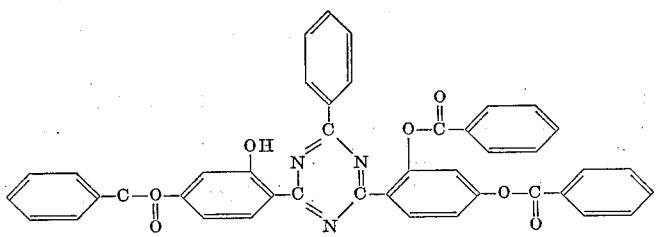

11. The compound of the formula
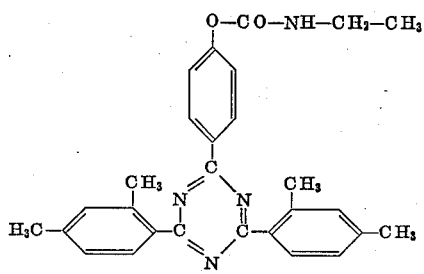
12. The compound of the formula
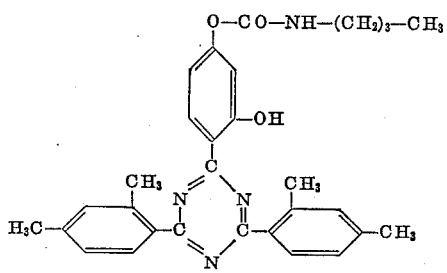
13. The compound of the formula
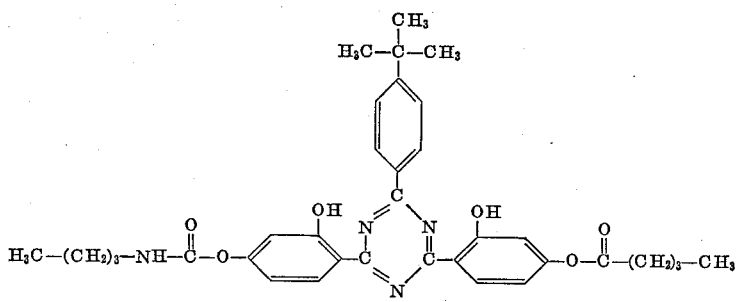
14. The compound of the formula
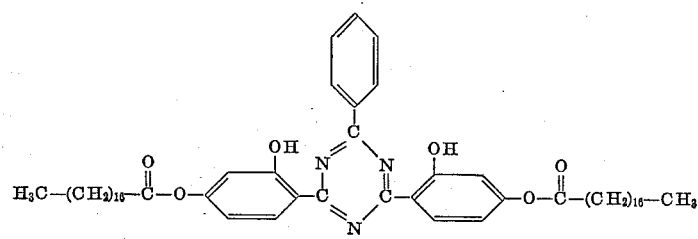
15. The compound of the formula
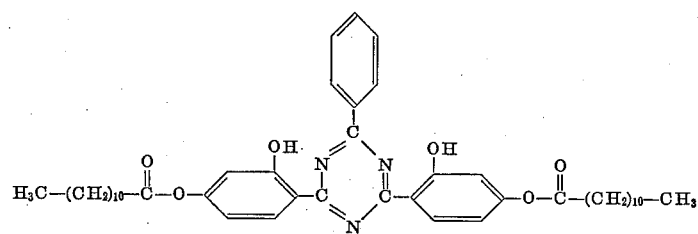
References Cited by the Examiner
UNITED STATES PATENTS
| | | | |
|---|---|---|---|
| 3,113,941 | 12/1963 | Johns et al. | 260—248 |
| 3,118,887 | 1/1964 | Hardy et al. | 260—248 |
WALTER A. MODANCE, *Primary Examiner.*
JAMES M. FORD, *Assistant Examiner.*